July 2, 1935.  T. B. MUNROE ET AL  2,007,130
COMPOUND UNIT FOR SOUND ABSORPTION
Filed March 14, 1934

Inventor:
TREADWAY B. MUNROE
CARL L. NEUMEISTER.
By Edw. A. Hampson Atty.

Patented July 2, 1935

2,007,130

UNITED STATES PATENT OFFICE 2,007,130

COMPOUND UNIT FOR SOUND ABSORPTION

Treadway B. Munroe, Chicago, and Carl L. Neumeister, Oak Park, Ill., assignors to The Celotex Company, Chicago, Ill., a corporation of Delaware Application March 14, 1934, Serial No. 715,496

2 Claims. (Cl. 72—18)

The art of acoustical correction by means of the absorption of sound is relatively a recent development, that is, the application or use thereof has only lately developed to any appreciable extent. In order that just what is meant by acoustical correction and in order that the disclosure hereof may be clearly understood, a short discussion thereof will be given.

The subject of acoustical correction by means of sound absorption as comprehended within this disclosure relates to constructions which form the walls of an enclosure, as for example, a room, including under the term walls also ceilings and floors, wherein the walls or parts thereof are composed of sound absorptive materials. In acoustical correction installations the sound absorption materials are incorporated in the walls in such manner that sound waves set up within the enclosure may directly impinge upon and penetrate into such sound absorptive substances. Usually the sound absorptive materials form those faces of the walls which are directly exposed to the sound waves, that is, the sound absorptive materials constitute in an enclosure, as a room, more or less of the actual exposed wall surface.

Acoustical correction through sound absorption is achieved by actual absorption of sound waves, that is, the energy of sound waves or the energy of their motion in air is caused to pass into a sound absorptive material wherein the regular oscillatory motion which is the basis of sound waves is to a large extent, generally through friction, transformed into heat energy. Since a portion of the original sound wave energy is converted into heat energy it, of course, follows that such portion of the sound wave as is reflected, that portion not absorbed, is correspondingly decreased in intensity and thus acoustical correction is achieved.

Sound absorption was probably first understood as such and mathematically treated by Baron Rayleigh in his publication "The Theory of Sound", Volume II, published in 1896. Rayleigh, on page 332, gives theoretical examples of sound absorption for walls made up of straight tubes with walls of infinite thinness for which, with the tubes of .001 cm. diameter, it is calculated that such layer 1 cm. thick will have absorption of about 4% and a similar layer 10 cm. thick will have absorption of about 34%. This matter, of course, deals only with a theoretical wall and Rayleigh ends up, on page 333, with the statement that thick carpets on the walls are probably the best solution of sound absorption problems.

Some years later Professor W. C. Sabine made extensive investigations concerning acoustical correction resulting eventually in several patents eventuating about 1912 to 1914 mostly dealing with various porous ceramic products adapted for sound absorption. Many other inventors have worked on this problem and beginning substantially with the patents to W. C. Sabine, a considerable volume of patents have issued relating to sound absorption.

For the purposes hereof, the prior patent art was carefully reviewed and all the sound absorption materials on the market, so far as available, were investigated. It was found that when carefully analyzed, that as a class, sound corrective products as heretofore developed have been substantially without exception quite fragile and quite unsatisfactory for use where severe conditions are met. Certain of proposed products, having cementitious casings with a face perforated for the admission of sound, are fragile because of the weakening caused by the perforations and due to the naturally low strength of the materials used. Ceramic and cementitious porous materials are in general of considerable fragility due to the thin walls which are necessary in order that sufficient porosity for appreciable sound absorption may be obtained. The felted fibrous products are, of course, quite fragile when subjected to severe conditions of use.

The object of this invention is, in the first instance, the production of a new and practical sound absorbing element or unit particularly adapted for use where the conditions of use are severe, but which nevertheless has a good coefficient of sound absorption.

Further objects of the invention include the development of a new combination of materials of the sound absorbing units, the development of the relationship of the elements of the unit to achieve the desired results and such other and further developments and improvements as flow therefrom.

In the course of this development it was discovered that by proper use of sound absorbing materials it is possible to in effect considerably increase the effective absorption whereby considerable savings may be made in the use of such materials. It was found that by the proper use, as will be herein elsewhere described, of about one-half a square foot of sound absorbing material substantially the same absorption may be obtained as is had from the use of one square foot of the material used without the advantage of the manner of use which has been developed.

A further portion of the discovery made, which is largely interdependent with the feature just above mentioned, is that substantially continuous porosity, or some approximation thereof, of the exposed surface of the sound absorbing material is not necessary. It was found that by appropriate use of what might be termed strip or slot exposure of the sound absorbing material it was necessary to actually expose but a small portion of the surface of the sound absorbing material to direct impingement by the sound waves to be absorbed.

In the accompanying drawing illustrative of the invention hereof.

Figure 1:
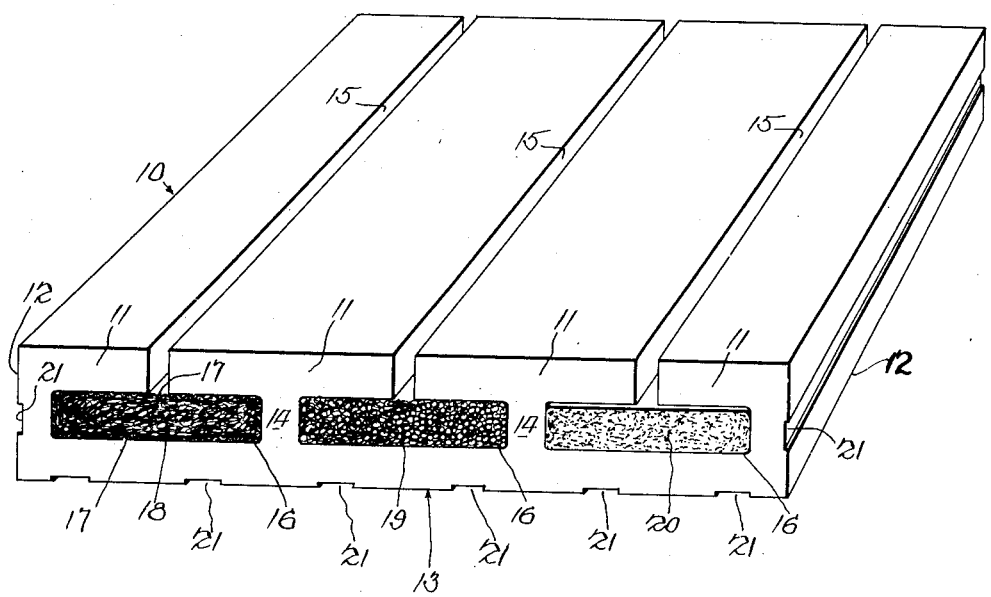
Figure 1 is a perspective view of a sound absorbing unit.

Since the primary idea back of the development of the sound absorbing unit heretof is that the unit shall be very substantial, a body or shell is provided which preferably is a terra cotta tile which may be either a glazed or unglazed tile, the walls of which may be solid or of more or less porosity interiorly. The body of the unit may also be made of other materials which can be formed into a rigid or substantially rigid structure. The tile body, if well glazed, is preferred as such body is fireproof, is little affected by repeated freezing and thawing temperatures, has very small water absorption and has other advantageous characteristics.

The body or shell which is the basis of the unit is indicated in the drawing by the numeral 10. The unit may be rectangular as indicated in the drawing, or square or in any other desired structural shape and may be what can be designated as a three cell unit as illustrated or comprise a single or any convenient number of cells.

The word cell as used above refers to the interior openings or channels 16 in the body unit formed by the face 11, back or rear 13, edges 12 and divisions 14, which together make up such body unit. Slots 15 in the face of the unit extend from that face 11 of the unit, which is to be exposed, through the material of the body and open into the interior cells thereof so that the interior openings are in free communication with the exterior.

For the actual absorption of sound in connection with the unit hereof, substantially any desired sound absorbing material may be used in cells 16. In one of the cells there is illustrated a sound absorbing element comprising fibrous material, felt or the like composed of wool, vegetative, mineral or like fiber, which element is indicated by numeral 18. The fibrous material may for convenience in handling and to prevent loss of fiber through slot 15 be enclosed in a wire screen casing 17 or in any other foraminous confining material.

In another cell 16 there is indicated a granular light weight porous filler 19 which may comprise particles of porous pumice, exfoliated zonalite or similar substances. This granular filler material may also be encased in a foraminous material 17 if desirable.

In the third cell there is indicated a sound absorbing element in the form of a block insert 20. The block insert 20 may be a strip of fiber board of the type usually designated as fiber insulation board, may be of porous sound absorbing plaster, a porous sound absorbing ceramic or the like.

Heretofore in the use of sound absorbing materials many constructions have been resorted to in an effort to provide paintable exposed surfaces thereon, to afford a high degree of light reflection, to protect relatively fragile sound absorbing materials from mechanical injury and so on. For these purposes referred to various facing materials have been used over sound absorbing materials, for example, coarsely woven cloth, wire screen, sheet metal punched with a great number of small holes together with other more or less like materials. All of these protective facings heretofore used have apparently been selected with the idea in mind that though the facing material may serve to protect the face of the sound absorbent, it must nevertheless be of such construction as to expose substantially all, or as nearly so as possible, of the face of the sound absorbing material which is protected. Stating this another way, such facing materials have been selected of such materials that the sound waves shall have direct access to substantially the entire face of the sound absorbing material.

It has been discovered that it is not at all necessary that the facing material shall be of such construction that it presents to the sound waves a substantially continuous perviousness to sound.

It has been discovered that the mere fact that a sound wave impinges against a solid surface, not a sound absorbent, does not necessarily mean that the sound wave will be substantially entirely reflected if certain conditions exist as will be explained. Sound waves in air constitute a series of compressions and rarefactions in an elastic fluid and when a sound wave impacts a substantially non-absorbent material it is not necessarily substantially reflected. If not too far distant from the point of impact of the sound wave with the surface, there is an opening or other sound absorbent, then the sound wave, in fact the compressions and rarefactions set up, will in effect flow in the elastic fluid toward and into such absorbent. While somewhat inaccurate scientifically, for purposes of description, it might well be said that sound waves impacting face 11 of the unit flow sideways across the face until a slot 15 is encountered, whereupon they flow down into the slot, thence pass into the sound absorbing elements in cells 16.

There are practical limits to the relationship between the width of the slots 17 and of the face 11 between slots. The relationship of width of slot to width of face between slots is a ratio of about 1 to 6, to 1 to 8, with a width of slot varying from the lower limit of around ⅛" to an upper limit of about ½".

A further fact discovered is that it is not at all necessary that the entire face of a sound absorbing element need be exposed, to impact by the sound waves to be absorbed provided a unit of the type disclosed is used. Not only is but a relatively small portion of the actual sound absorbing material exposed to impact by the sound waves but substantially the absorption per square foot is obtained with the use of about one half square foot of sound absorbing element in a unit compared with a surface covered with a continuous sound pervious covering or with the sound absorbing element material completely exposed.

The apparent practical relationship of the ratio of width of sound absorbing element to width of slot appears to be about 6 to 1 to 8 to 1, that is, only about 12% to 15% or thereabouts of the sound absorbing element need be exposed to sound wave impact.

Figure 2:
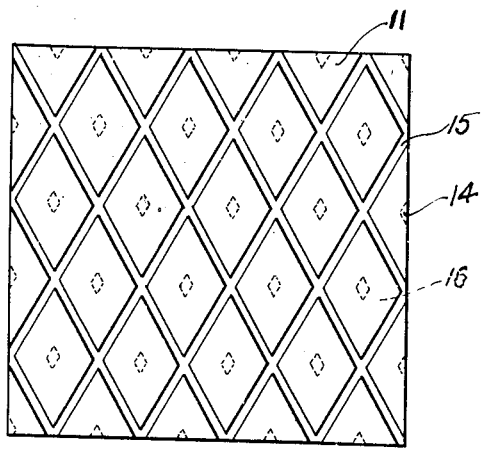
Figure 2 is a top plan view of a unit showing a somewhat modified treatment.

Whereas the foregoing description of the invention has been based on the construction, particularly illustrated in Figure 1, it is to be understood that the inventions hereof may be incorporated into units of different structural formation; for example, the teachings may be utilized in designing a unit such as is diagrammatically illustrated in Figure 2. The unit shown in Figure 2 is in substance generally similar to the unit of Figure 1, structurally, but instead of the cells being a single series of spaced parallel openings through the unit, there are provided a double series of parallel cells 16 angularly displaced and with the two series intersecting. This construction provides pillar-like supports for the top face 11 which, when slotted with slots 15 corresponding to the positioning of cells 16, subdivides the face 11 into a plurality of diamond shaped elements bounded by the slot 15.

The invention hereof having been fully described, we claim:

1. An acoustical correction unit comprising a block of relatively hard and dense material having but low inherent capacity for sound absorption, the block comprising a face portion, a back portion and a plurality of connecting webs therebetween, providing a plurality of elongated open channels extending interiorly therethrough, the channels and connecting webs of such relative widths that the ratio of their cross sections is between 2 to 1 and 1 to 1, elements of sound absorbing material in the elongated channels and elongated narrow slots extending through the face portion coextensive longitudinally with the interior channels and providing communication from the exterior of the block into the interior of the block into the interior channels thereof.

2. An acoustical correction unit comprising a hard dense enclosing casing, spaced longitudinal interior channels extending through the casing, fillers of material of substantial sound absorbing capacity in the interior channels and for each channel substantially medially thereof an elongated narrow slot providing communication from the exterior of the unit therethrough and to the filler in the interior channel, the ratio of the width of a slot to the width of a filler lying between the ratios of 1 to 3 and 1 to 4.

TREADWAY B. MUNROE.
CARL L. NEUMEISTER.